(12) United States Patent
Wakabayashi et al.

(10) Patent No.: US 8,517,539 B2
(45) Date of Patent: Aug. 27, 2013

(54) IMAGE FORMING APPARATUS

(75) Inventors: Shuichi Wakabayashi, Okaya (JP); Norio Nakamura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 901 days.

(21) Appl. No.: 12/362,788

(22) Filed: Jan. 30, 2009

(65) Prior Publication Data

US 2009/0195644 A1    Aug. 6, 2009

(30) Foreign Application Priority Data

Jan. 31, 2008  (JP) ................................. 2008-020344

(51) Int. Cl.
*G02B 26/08*   (2006.01)
(52) U.S. Cl.
USPC ......................................... 353/50; 359/204.4
(58) Field of Classification Search
USPC ................. 359/196.1–226.3; 353/39, 50–51, 353/46

See application file for complete search history.

(56) References Cited

U.S. PATENT DOCUMENTS

| | | | |
|---|---|---|---|
| 7,434,939 B2 | 10/2008 | Tajiri | |
| 7,619,599 B2 | 11/2009 | Miyazawa | |
| 2006/0139718 A1* | 6/2006 | Ishihara | ........................ 359/205 |
| 2009/0195644 A1 | 8/2009 | Wakabayashi et al. | |

FOREIGN PATENT DOCUMENTS

| | | |
|---|---|---|
| CN | 1896792 A | 1/2007 |
| JP | 2008-180779 | 6/2000 |
| JP | 2001-249401 | 9/2001 |
| JP | 2002-214579 | 7/2002 |
| JP | 2005-331906 | 12/2005 |
| JP | 2007-047243 | 2/2007 |
| JP | 4434283 B | 1/2010 |

\* cited by examiner

*Primary Examiner* — Jennifer L. Doak

(57) ABSTRACT

An image forming apparatus includes a light emitting unit that emits light; a light scanning unit having at least one actuator, wherein the actuator irradiating and scanning the light reflected on a light reflector onto an image forming plane by rotation of a movable plate; a drive pattern generating unit that generates a drive pattern of the light emitting unit, wherein the light emitting unit can emit the light with emission timing and emission time to suppress density of the pixels in each portion of the image to be formed on the image forming plane from becoming ununiformity; and a controlling unit that controls operation of the light emitting unit based on the drive pattern generated by the drive pattern generating unit.

8 Claims, 12 Drawing Sheets

IMAGE FORMING APPARATUS

CROSS-REFERENCE TO RELATED APPLICATION

This application claims a priority to Japanese Patent Application No. 2008-020344 filed on Jan. 31, 2008 which is hereby expressly incorporated by reference herein in its entirety.

BACKGROUND

1. Technical Field

The present invention relates to an image forming apparatus.

2. Related Art

As an example of an image forming apparatus for forming (projecting) an image composed of pixels by irradiating light, a projection type projector as disclosed in JP-A-2001-249401 is well known.

The projection type projector disclosed in JP-A-2001-249401 has a projector main body and a correcting means that corrects trapezoidal distortion of an image formed on a screen in the case where the projector main body is placed so as to incline with respect to the screen. The term "trapezoidal distortion" refers to geometric distortion where the image has different lateral lengths on top and bottom edges thereof.

Therefore, when an image is formed on a planar screen, the projection type projector disclosed in JP-A-2001-249401 can form a natural image whose distortion is corrected.

However, for example, when an image is formed on a non-planar screen curved in a semi-circular shape, incident angles of the light irradiated with respect to portions of the non-planar screen and distances from the projector main body to the respective portions of the non-planar screen are different from each other.

For this reason, density of the pixels (i.e. the number of the pixels per unit length) in each portion of the image to be formed on the non-planar screen becomes ununiformity. As a result, distortion or deflection of the image occurs. This means that the natural image cannot be formed.

Specifically, for example, in the case where the incident angles of the light irradiated with respect to the portions of the non-planar screen are different from each other, when the projector is operated in the same manner as the event of forming the image on the planar screen, the larger the incident angle of the light irradiated with respect to the portion has, the greater sizes of the pixels existing therein become.

Thereby, the density of the pixels (i.e. the number of the pixels per unit length) in each portion of the image formed on the non-planar screen has a rare-dense profile, as a result of which distortion or deflection of the image occurs.

Likewise, in the case where the distances from the projector main body to the respective portions of the non-planar screen are different from each other, the larger the distance from the projector main body to the portion has, the greater the sizes of the pixels existing therein become.

Thereby, the density of the pixels in each portion of the image formed on the non-planar screen has a rare-dense profile, as a result of which distortion or deflection of the image occurs.

SUMMARY

Accordingly, it is an object of the present invention to provide an image forming apparatus that can form an image composed of pixels on an image forming plane such that, by suppressing density of the pixels in each portion of the image to be formed on the image forming plane from becoming ununiformity, a natural image free from distortion or deflection is observed regardless of a shape of the image forming plane even in the case where the image forming plane is viewed at any position.

In order to achieve the object, an aspect of the present invention is directed to an image forming apparatus. The image forming apparatus forms an image composed of pixels on an image forming plane, which is set on a surface of a target, by irradiating and scanning light onto the image forming plane.

Such an image forming apparatus comprises a light emitting unit that emits the light; a light scanning unit having at least one actuator in which a movable plate having a light reflector that reflects the light emitted from the light emitting unit is rotatably provided around one rotation axis or two rotation axes which are orthogonal to each other, the actuator irradiating and scanning the light reflected on the light reflector onto the image forming plane by rotation of the movable plate; a drive pattern generating unit that generates a drive pattern of the light emitting unit, the drive pattern by which the light emitting unit can emit the light with such timing and emission time that suppress density of the pixels in each portion of the image to be formed on the image forming plane from becoming ununiformity, wherein the ununiformity in the density of the pixels would be generated due to differences between incident angles of the light to be irradiated with respect to portions of the image forming plane corresponding to the respective pixels or differences between distances from the light emitting unit to the respective portions of the image forming plane; and a controlling unit that controls operation of the light emitting unit based on the drive pattern generated by the drive pattern generating unit.

This makes it possible to form a natural image free from distortion or deflection regardless of a shape of the image forming plane even in the case where the image forming plane is viewed at any position.

In the above image forming apparatus, it is preferred that the drive pattern generating unit sets a plurality of unit irradiation areas, onto which the light is irradiated, on the image forming plane, each of the unit irradiation areas having substantially the identical length in a scanning direction of the light to provide one of the pixels of the image, wherein the drive pattern generating unit generates a plurality of unit drive patterns corresponding to the respective unit irradiation areas, and the unit drive patterns constitute the drive pattern.

This makes it possible to set the unit irradiation areas on the image forming plane substantially uniformly. As a result, it is possible to form a natural image free from undesired distortion or deflection.

In the above image forming apparatus, it is preferred that the drive pattern generating unit includes a shape specifying portion that specifies a shape of the image forming plane, an irradiation locus setting portion that sets an irradiation locus of the light based on the shape specified by the shape specifying portion, and an unit irradiation area setting portion that sets the plurality of the unit irradiation areas on and along the set irradiation locus.

This makes it possible to generate the drive pattern of the light emitting unit, constituted from the unit drive patterns each having high accuracy, using a relatively simple construction of the drive pattern generating unit.

In the above image forming apparatus, it is preferred that in the case where X, Y and Z axes are set as three orthogonal coordinate axes and coordinates on the image forming plane corresponding to the X, Y and Z axes are defined as x, y and z, the image forming plane has a geometrical shape that can be represented by or approximated to a function: f(x, y, z) and the shape specifying portion specifies the geometrical shape of the image forming plane based on the function.

This makes it possible to more correctly specify the geometrical shape of the image forming plane.

In the above image forming apparatus, it is preferred that in the case where the image forming plane has a shape with irregularly curved and/or bended regions, the shape specifying portion defines the image forming plane as a set of polygons and specifies the shape of the image forming plane based on three-dimensional coordinates of the apexes of the respective polygons.

This also makes it possible to more correctly specify the shape of the image forming plane.

In the above image forming apparatus, it is preferred that the drive pattern generating unit generates the unit drive patterns in such a manner that the larger the incident angle of the light to be irradiated on the unit irradiation area has, the shorter the emission time of the light emitted from the light emitting unit is set.

This makes it possible to more effectively form a natural image free from distortion or deflection.

In the above image forming apparatus, it is preferred that the drive pattern generating unit generates the unit drive patterns in such a manner that the longer the distance from the light emitting unit to the unit irradiation area has, the shorter the emission time of the light emitted from the light emitting unit is set.

This makes it possible to more effectively form a natural image free from distortion or deflection.

In the above image forming apparatus, it is preferred that the drive pattern generating unit generates the unit drive patterns in such a manner that intensity of the light emitted from the light emitting unit is changed for each of the unit irradiation areas.

By doing so, it is possible to prevent an image to be formed from having uneven brightness. This makes it possible to obtain a more natural image on the image forming plane.

In the above image forming apparatus, it is preferred that the drive pattern generating unit generates the unit drive patterns in such a manner that the intensity of the light emitted from the light emitting unit is changed according to the emission time thereof for each of the unit irradiation areas.

By doing so, it is possible to prevent an image to be formed from having uneven brightness. This makes it possible to obtain a more natural image on the image forming plane.

In the above image forming apparatus, it is preferred that the at least one actuator comprises a pair of the actuators, wherein each of the actuators includes the movable plate having a rotation axis, a supporting portion that rotatably supports the movable plate, at least one connecting portion that connects the movable plate to the supporting portion and defines the rotation axis, and a driving portion that rotates the movable plate, and wherein the actuators are provided such that the rotation axis of the movable plate of one of the actuators and the rotation axis of the movable plate of the other actuator are orthogonal to each other.

This makes it possible to two-dimensionally scan the light, emitted from the light emitting unit, onto the image forming plane using a relatively simple construction of the light scanning unit.

In the above image forming apparatus, it is preferred that the light scanning unit further includes a rotation detecting portion that detects the rotation of the movable plate of the at least one actuator, and the controlling unit controls the operation of the light emitting unit based on a result of the detection by the rotation detecting portion and the drive pattern.

This makes it possible to more reliably set the timing by which the light is emitted from the light emitting unit.

In the above image forming apparatus, it is preferred that the target comprises a screen.

This makes it possible to improve visibility of the image.

DESCRIPTION OF EXEMPLARY EMBODIMENTS

Hereinafter, preferred embodiments of a n image forming apparatus of the present invention will be described in detail with reference to the accompanying drawings.

First Embodiment

First, a first embodiment of the image forming apparatus of the present invention will be described.

Figure 1:
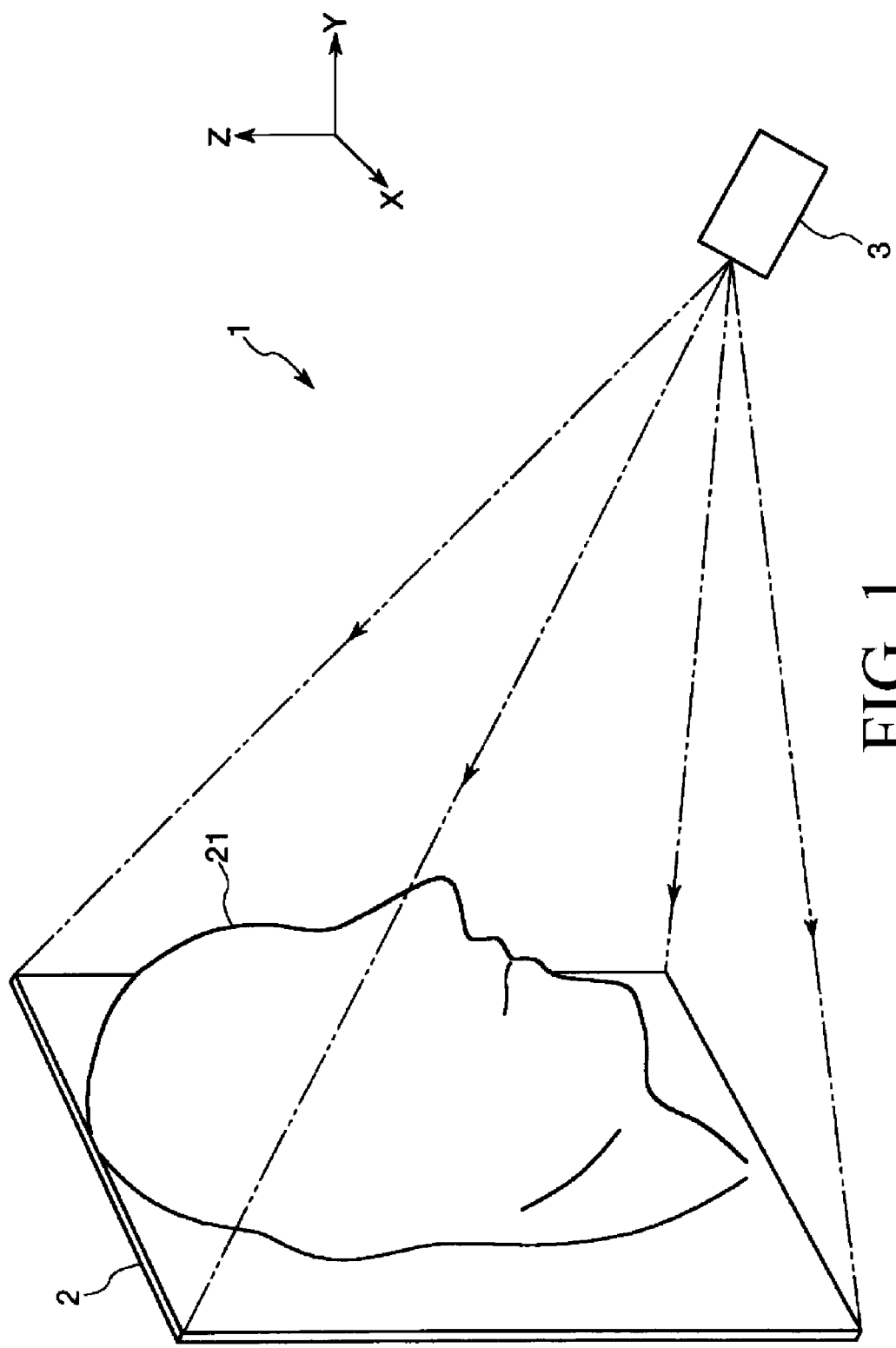
FIG. 1 is a configuration view illustrating a first embodiment of an image forming apparatus of the present invention.
Figure 2:
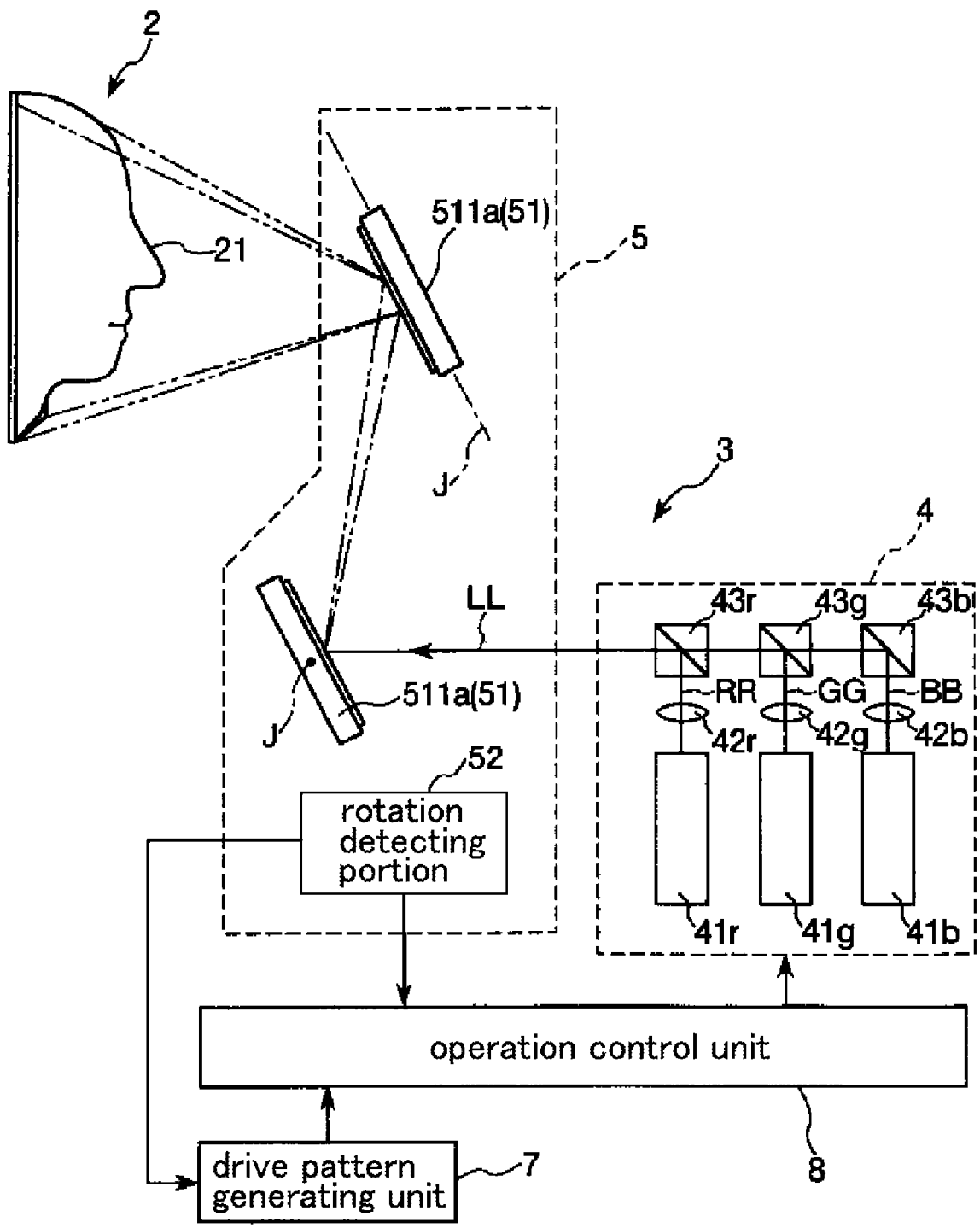
FIG. 2 is a block diagram of the image forming apparatus shown in FIG. 1.
Figure 3:
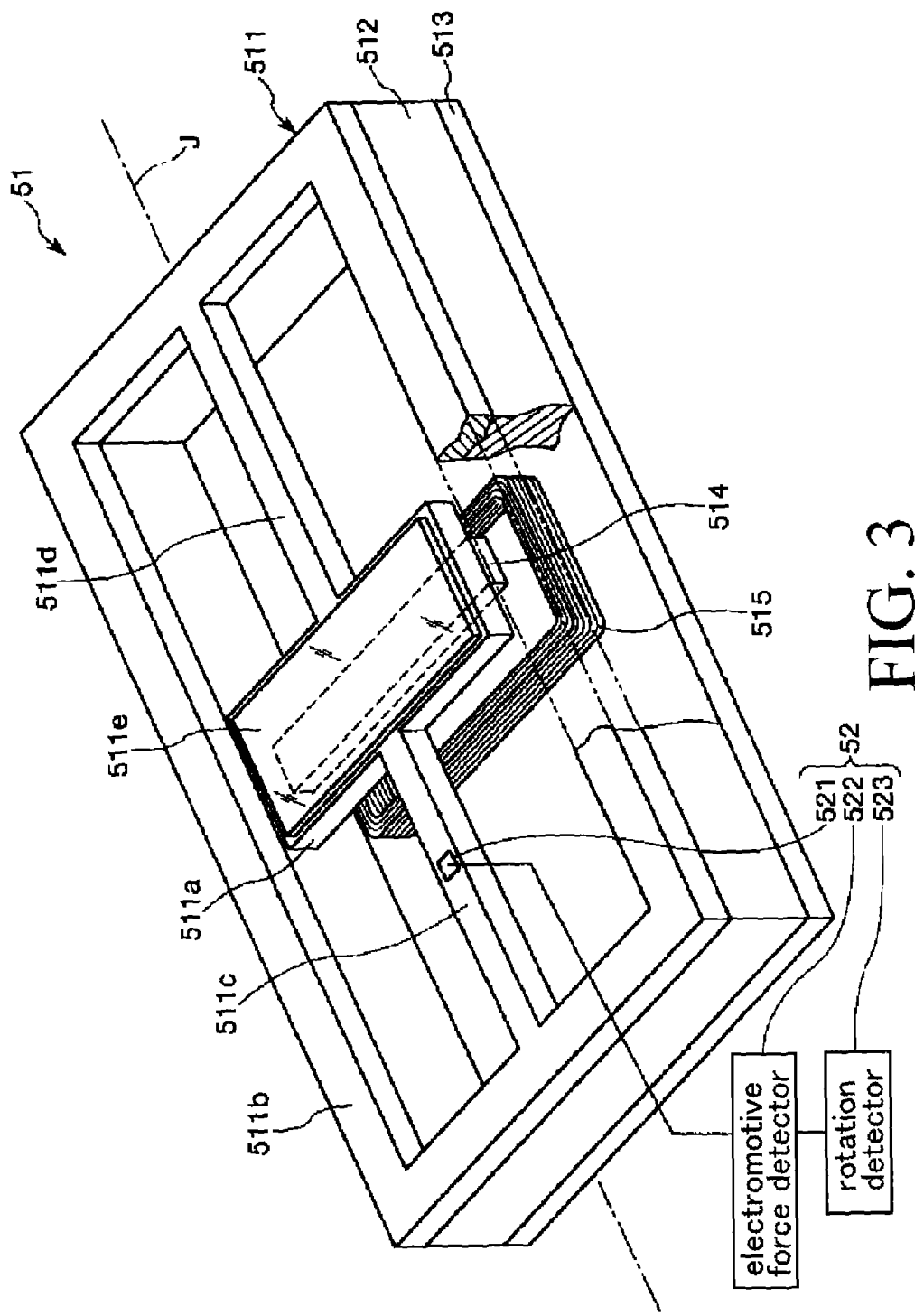
FIG. 3 is a schematic perspective view illustrating an actuator shown in FIG. 2.
Figure 4:
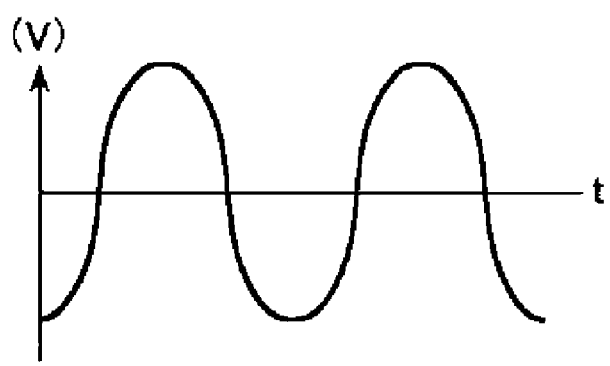
FIG. 4 is a graph illustrating an example of a voltage applied to a coil shown in FIG. 3.

FIG. 1 is a configuration view illustrating the first embodiment of the image forming apparatus of the present invention, FIG. 2 is a block diagram of the image forming apparatus shown in FIG. 1, FIG. 3 is a schematic perspective view illustrating an actuator shown in FIG. 2, and FIG. 4 is a graph illustrating an example of a voltage applied to a coil shown in FIG. 3.

Figure 5A:
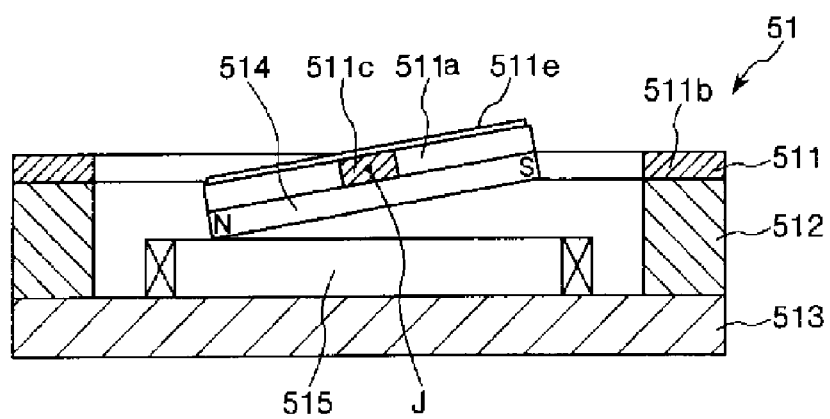
FIGS. 5A and 5B are schematic cross-sectional views each illustrating operation of the actuator shown in FIG. 3.
Figure 5B:
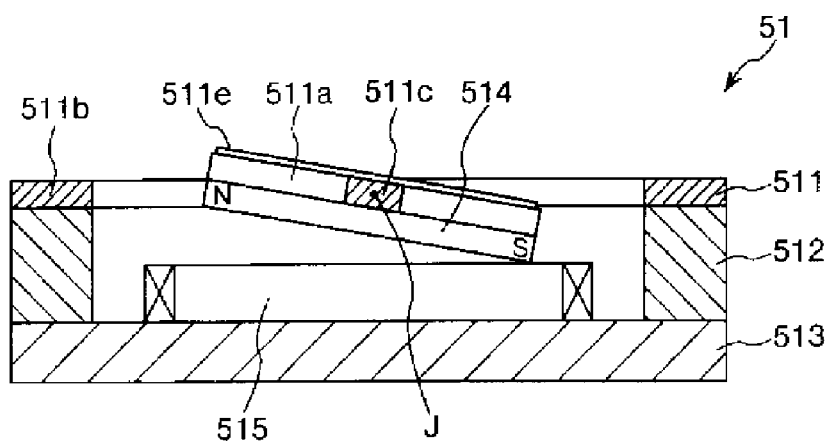
Figure 6:
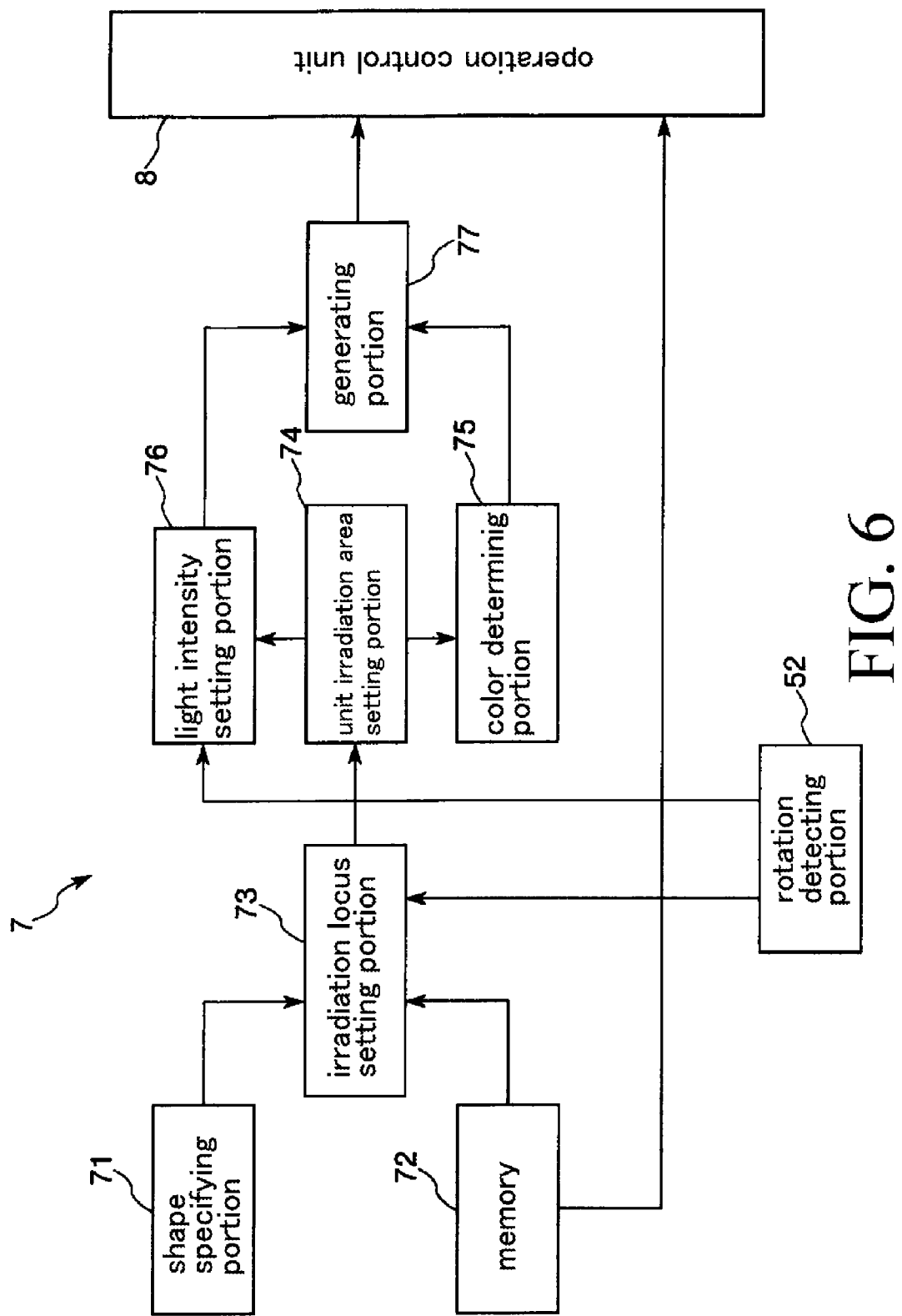
FIG. 6 is a block diagram illustrating a drive pattern generating unit shown in FIG. 2.
Figure 7:
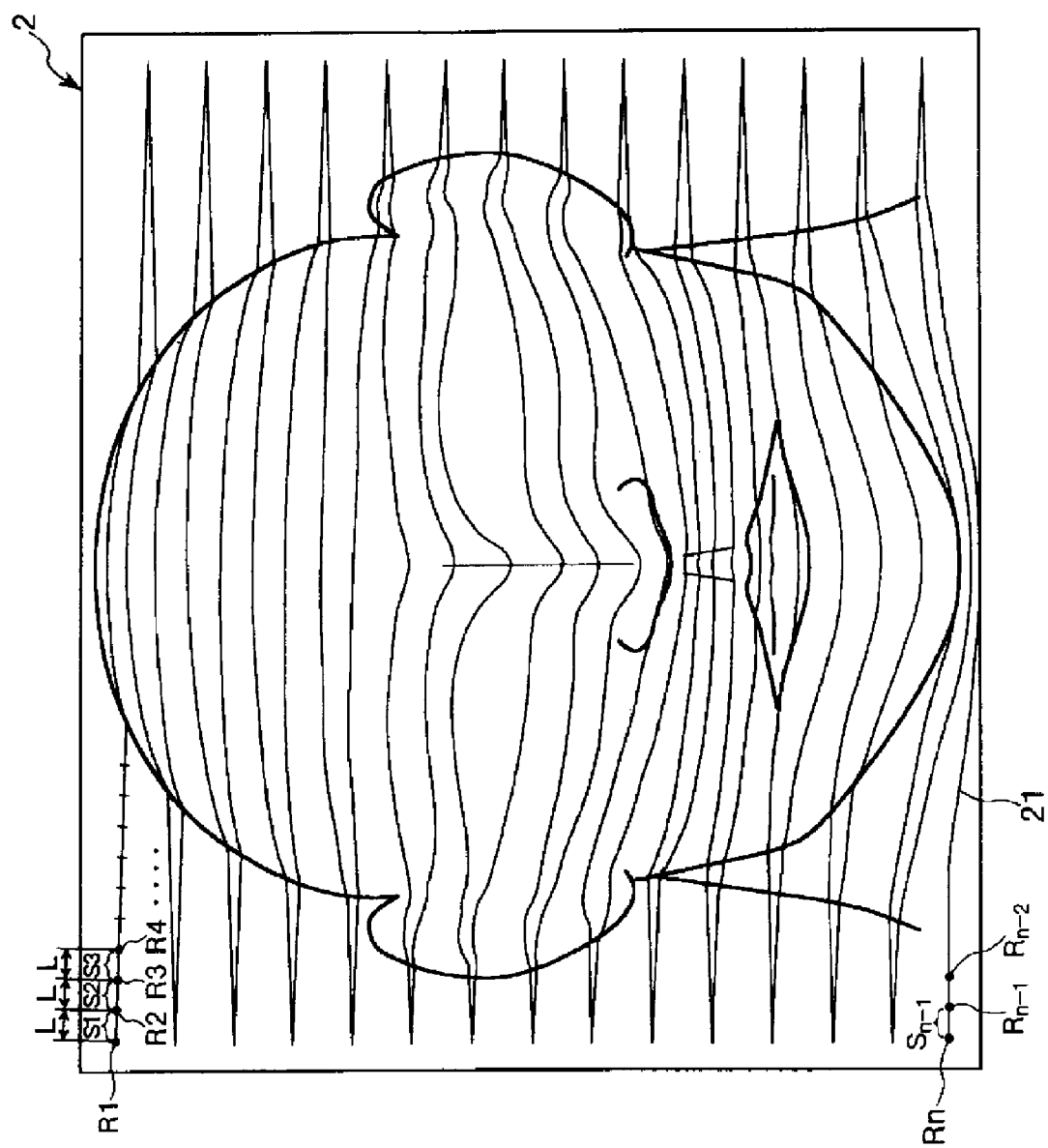
FIG. 7 is a view illustrating an irradiation locus set by an irradiation locus setting portion shown in FIG. 6.

FIGS. 5A and 5B are schematic cross-sectional views each illustrating operation of the actuator shown in FIG. 3, FIG. 6 is a block diagram illustrating a drive pattern generating unit shown in FIG. 2, and FIG. 7 is a view illustrating an irradiation locus set by an irradiation locus setting portion shown in FIG. 6.

For the sake of convenience, in the following description, an upper side, a lower side, a right side and a left side shown in each of FIGS. 3, 5A and 5B will be referred to as "upper (top)", "lower (bottom)", "right" and "left", respectively, if not otherwise specified. In addition, three orthogonal axes as shown in FIG. 1 will be referred to as "X", "Y" and "Z" axes, respectively.

As shown in FIG. 1, an image forming apparatus 1 includes a screen 2 and an image forming apparatus main body 3 that irradiates and scans light (a laser beam LL in this embodiment as shown in FIG. 2) onto the screen 2 to form an image composed of pixels on the screen 2.

Such an image forming apparatus 1 is configured to form the image on the screen 2 such that an observer (not shown) can observe a natural image free from (without) distortion or deflection irrespective of places from which the observer watches the screen 2.

Hereinafter, these components will be described one after another.

The screen 2 of this embodiment has a portion with a human face-like shape and maintains substantially constantly the shape thereof. In addition, the screen 2 is fixed such that the portion with the human face-like shape faces the image forming apparatus main body 3 and maintains substantially constantly a distance therefrom.

A surface of the screen 2 facing the image forming apparatus main body 3 defines a light scanning plane (an image forming plane) 21 onto which the image forming apparatus main body 3 irradiates and scans the laser beam LL.

Use of such a screen 2 makes it possible to improve visibility of the image. For example, a human face image corresponding to the shape of the light scanning plane 21 is formed on the light scanning plane 21 by the image forming apparatus main body 3.

A constituent material of the screen 2 is not particularly limited to a specific type as long as the screen 2 can maintain substantially constantly the shape thereof.

Examples of the constituent material include polyethylene, polypropylene, polyvinyl chloride, polystyrene, polyamide, acryl-based resin, ABS resin, fluoro-based resin, epoxy resin, silicone resin; a copolymer, a blended body and a polymer alloy each containing at least one of these materials as a major component thereof; and one or more of which may be used independently or in combination.

Next, the image forming apparatus main body 3 will be described.

As shown in FIG. 2, the image forming apparatus main body 3 includes a light source unit (a light emitting unit) 4 that emits the laser beam LL, a light scanning unit 5 that irradiates and scans the laser beam LL emitted from the light source unit 4 onto the light scanning plane 21, a drive pattern generating unit 7 that generates a drive pattern of the light source unit 4, and an operation control unit (a controlling unit) 8 that controls operation of the light source unit 4.

Hereinafter, these components will be described one after another.

As shown in FIG. 2, the light source unit 4 includes laser sources 41r, 41g and 41b that emit laser beams of different colors, collimator lenses 42r, 42g and 42b, and dichroic mirrors 43r, 43g and 43b. The collimator lenses 42r, 42g and 42b and the dichroic mirrors 43r, 43g and 43b are provided corresponding to the laser sources 41r, 41g and 41b, respectively.

The laser sources 41r, 41g and 41b emit red, green and blue laser beams RR, GG and BB, respectively. The respective laser beams RR, GG and BB are emitted after being modulated so as to correspond to driving signals (signals corresponding to the drive pattern which will be described later) transmitted from the operation control unit 8, and then are parallelized by the collimator lenses 42r, 42g and 42b which are collimate optical elements so that they are transformed into narrow beams each formed from parallel light fluxes.

The dichroic mirrors 43r, 43g and 43b are configured to reflect red, green and blue laser beams RR, GG and BB, respectively, so as to combine the laser beams RR, GG and BB of different colors into the one laser beam LL.

In this regard, it is to be noted that the collimator lenses 42r, 42g and 42b can be replaced by collimator mirrors, each of which can also form the narrow beams each formed from the parallel light fluxes. Further, the collimator lenses 42r, 42g and 42b can be omitted in the case where the laser sources 41r, 41g and 41b emit laser beams RR, GG and BB each formed from parallel light fluxes, respectively.

In addition, the laser sources 41r, 41g and 41b can be replaced by other types of light sources such as light emitting diodes (LEDs) that can generate the above parallel light fluxes.

Next, the light scanning unit 5 will be described.

As shown in FIG. 2, the light scanning unit 5 includes a pair of actuators 51 and a rotation detecting portion 52 that detects rotation (motion) of each actuator 51. In this regard, it is to be noted that since the pair of the actuators 51 have the same construction, one of the actuators 51 will be representatively described hereinafter and description of the other actuator 51 will be omitted.

As shown in FIG. 3, the actuator 51 includes a substrate 511, an opposite substrate 513 provided so as to face a lower surface of the substrate 511, and a spacer member 512 provided between the substrate 511 and the opposite substrate 513.

The substrate 511 includes a movable plate 511a, a supporting portion 511b that rotatably supports the movable plate 511a, and a pair of connecting portions 511c and 511d that connect the movable plate 511a to the supporting portion 511b.

The movable plate 511a has a substantially rectangular shape in a planar view thereof. A light reflector 511e having light reflectivity is provided on an upper surface of the movable plate 511a. The light reflector 511e is, for example, formed from a metal film such as an Al film or a Ni film. In addition, a permanent magnet 514 is provided on a bottom surface of the movable plate 511a.

The supporting portion 511b is provided so as to surround an outer circumference of the movable plate 511a in the planar view of the movable plate 511a (the actuator 51). That is, the supporting portion 511b has a frame shape, and the movable plate 511a is located inside the supporting portion 511b.

The connecting portion 511c connects the movable plate 511a to the supporting portion 511b on a left side of the movable plate 511a, and the connecting portion 511d connects the movable plate 511a to the supporting portion 511b on a right side of the movable plate 511a.

Each of the connecting portions 511c and 511d has a longitudinal shape. In addition, the connecting portions 511c and 511d are elastically deformable. The pair of the connecting portions 511c and 511d are coaxially provided with each other so that the movable plate 511a rotates with respect to the supporting portion 511b around one rotation axis.

In other words, the movable plate 511a has one rotation axis and the connecting portions 511c and 511d define the one rotation axis (hereinafter, referred to as "rotation axis J").

Such a substrate 511 is made of, for example, silicon as a major component thereof, in which the movable plate 511a, the supporting portion 511b and the connecting portions 511c and 511d are integrally formed.

Use of silicon as the major component of the substrate 511 makes it possible to achieve excellent rotation characteristics of the movable plate 511a as well as excellent endurance of the substrate 511 (the actuator 51). Further, this also makes it possible to carry out micromachining of the substrate 511 and to achieve miniaturization of the actuator 51.

The spacer member 512 has a frame shape, and an upper surface thereof is bonded to the bottom surface of the substrate 511. The spacer member 512 has substantially the same shape as the supporting portion 511b in the planar view of the movable plate 511a. Such a spacer member 512 is made of, for example, various kinds of glasses, various kinds of ceramics, silicon, $SiO_2$ and the like.

Like the spacer member 512, the opposite substrate 513 is made of, for example, various kinds of glasses, silicon, $SiO_2$ and the like. A coil 515 is provided on a portion of an upper surface of the opposite substrate 513 which faces the movable plate 511a.

The permanent magnet 514 has a plate bar shape and is provided on the bottom surface of the movable plate 511a so as to be bonded thereto. Such a permanent magnet 514 is magnetized in a direction orthogonal to the rotation axis J in the planar view of the movable plate 511a.

Specifically, the permanent magnet 514 is provided such that a segment connecting opposite poles (S and N poles) is orthogonal to the rotation axis J. Referring to each of FIGS. 5A and 5B, a left side of the permanent magnet 514 from the rotation axis J is the N pole and a right side thereof from the rotation axis J is the S pole.

Such a permanent magnet 514 is not peculiarly limited to a specific type, but a neodymium magnet, a ferrite magnet, a samarium-cobalt magnet, an alnico magnet and the like can be used as the permanent magnet 514.

The coil 515 is provided so as to surround an outer circumference of the permanent magnet 514 in the planar view of the movable plate 511a. The coil 515 is connected to the operation control unit 8 and is applied with a predetermined level of a voltage by the operation control unit 8.

For example, when an alternating voltage as shown in FIG. 4 is applied to the coil 515 by the operation control unit 8, a magnetic field is generated in a thickness direction of the movable plate 511a (i.e., a vertical direction in each of FIGS. 5A and 5B) and is turned over cyclically.

Namely, the following A and B states occur alternately, wherein in the A state, an upper portion of the coil 515 becomes the S pole and a lower portion thereof becomes the N pole, whereas in the B state, the upper portion of the coil 515 becomes the N pole and the lower portion thereof thereof becomes the S pole.

In the A state, as shown in FIG. 5A, the right side of the permanent magnet 514 moves upwards due to a repulsive force against a magnetic field generated by energization of the coil 515 and, at the same time, the left side of the permanent magnet 514 moves downwards due to an attractive force with the same magnetic field. Accordingly, the movable plate 511a inclines counterclockwise.

In contrast, in the B state, as shown in FIG. 5B, the right side of the permanent magnet 514 moves downwards and, at the same time, the left side of the permanent magnet 514 moves upwards. Accordingly, the movable plate 511a inclines clockwise.

By alternatively repeating the A state and the B state, the movable plate 511a rotates around the rotation axis J while torsionally deforming the connecting portions 511c and 511d.

The construction of the actuator 51 is not specifically limited to a specific type as long as the movable plate 511a can rotate. The actuator may be what is called a two-degree-of-freedom vibration system actuator.

Further, as the actuating system of the actuator 51, a piezoelectric actuating system using a piezoelectric element or a static actuating system by static attraction may be employed in place of the electromagnetic actuating system using the coil 515 and the permanent magnet 514.

As shown in FIG. 2, the actuators 51 each having the above described construction are provided such that the rotation axis J of the movable plate 511a of one of the actuators 51 and the rotation axis J of the movable plate 511a of the other actuator 51 are orthogonal to each other.

This makes it possible to two-dimensionally scan the laser beam LL, emitted from the light source unit 4, onto the light scanning plane 21 using a relatively simple construction of the light scanning unit 5.

Next, the rotation detecting portion 52 will be described.

The rotation detecting portion 52 that detects rotation of the movable plate 511a of one of the actuators 51 has the same construction as the rotation detecting portion 52 that detects rotation of the movable plate 511a of the other actuator 51.

Therefore, the rotation detecting portion 52 that detects the rotation of the movable plate 511a of the one actuator 51 will be representatively described hereinafter and description of the rotation detecting portion 52 that detects the rotation of the movable plate 511a of the other actuator 51 will be omitted.

As shown in FIG. 3, the rotation detecting portion 52 includes a piezoelectric element 521 provided on the connecting portion 511c of the actuator 51, an electromotive force detector 522 that detects an electromotive force generated from the piezoelectric element 521, and a rotation detector 523 that detects the rotation of the movable plate 511a based on a result of the detection by the electromotive force detector 522.

When the connecting portion 511c is torsionally deformed according to the rotation of the movable plate 511a, the piezoelectric element 521 is deformed in response to the torsional deformation of the connecting portion 511c, thereby generating an electromotive force corresponding to an amount of the deformation thereof.

The rotation detector 523 obtains a degree of the torsional deformation of the connecting portion 511c based on an amount of the electromotive force detected by the electromotive force detector 522 and also detects the rotation (a rotation angle) of the movable plated 511a based on the degree of the torsional deformation of the connecting portion 511c.

Thereafter, a signal having information on the rotation of the movable plate 511a, detected by the rotation detector 523, is transmitted to the operation control unit 8.

The rotation detecting unit 52 may detect the rotation of the movable plate 511a in real time. Alternatively, for example, when the rotation of the movable plate 511a is detected at a predetermined timing (time point), the rotation detecting unit 52 may predict the rotation of the movable plate 511a based on the detected timing and the alternating voltage (a waveform or frequency) applied to the coil 515.

The rotation detecting unit 52 may be not constructed using the piezoelectric element as in this embodiment as long as it can detect the rotation of the movable plate 511a. For example, the rotation detection unit 52 can be constructed using a light emitting element (e.g., a light emitting diode) and a light receiving element (e.g., a photodiode).

In this case, the light receiving element may be configured to receive light emitted from the light emitting element (or block receiving of the light emitted from the light emitting element) when the movable plate 511a inclines at a predetermined rotation angle, and the rotation of the movable plate 511a may be detected based on timing when the light receiving element receives the light (or the receiving of the light by the light receiving element is blocked).

Next, the drive pattern generating unit 7 will be described.

As shown in FIG. 6, the drive pattern generating unit 7 includes a shape specifying portion 71 that specifies the shape of the light scanning plane 21, a memory 72 that stores three-dimensional coordinates of each of the actuators 51 and the like, an irradiation locus setting portion 73 that sets an irradiation locus (track) of the above-described laser beam LL on the light scanning plane 21, and a unit irradiation area setting portion 74 that sets a plurality of unit irradiation areas on and along the set irradiation locus.

Such a drive pattern generating unit 7 further includes a color determining portion 75 that determines color (luminance of each color) of the laser beam LL to be irradiated for each of the unit irradiation areas, a light intensity setting portion 76 that sets an irradiation time (that is, an emission time) and intensity of the laser beam LL for each of the unit irradiation areas, and a generating portion 77 that generates the drive pattern of the light source unit 4.

The shape specifying portion 71 defines the shape of the light scanning plane 21 of the screen 2 as a set of a plurality of polygons and also specifies the shape of the light scanning plane 21 based on three-dimensional coordinates of the apexes of the respective polygons. The three-dimensional coordinates of each of the apexes are stored in the shape specifying portion 71.

As described above, the light scanning plane 21 of this embodiment has the portion with the human face-like shape, and such a portion has irregularly curved and/or bended regions. Therefore, use of the above specifying method of the shape of the light scanning plane 21 makes it possible to more correctly specify the shape of the light scanning plane 21.

As a matter of course, the shape of the light scanning plane 21 can be specified more precisely if the light scanning plane 21 is defined by a set of a more number of the polygons. In addition, while one polygon is typically a triangle or quadrangle, it may be a pentagon or have more than five sides and five interior angles.

In this regard, it is to be noted that the term "three-dimensional coordinates" refers to coordinates corresponding to three coordinate axes consisting of the X, Y and Z axes.

The memory 72 stores an optical path of the laser beam LL between the pair of the actuators 51 and three-dimensional coordinates of the pair of the actuators 51.

The irradiation locus setting portion 73 is connected to the shape specifying portion 71 and the memory 72. Such an irradiation locus setting portion 73 receives signals regarding the three-dimensional coordinates of the respective apexes as described above from the shape specifying portion 71 and also receives signals regarding the optical path of the laser beam LL and the three-dimensional coordinates of the actuators 51 from the memory 72.

The irradiation locus setting portion 73 obtains relative positional relationships of the pair of the actuators 51 and the light scanning plane 21 based on the above signals (information).

In addition, the irradiation locus setting portion 73 is connected to the above-described rotation detecting unit 52 to receive signals regarding the rotation of each of the movable plates 511a from the rotation detecting unit 52. Use of the signals and the relative positional relationships makes it possible to determine a portion of the light scanning plane 21, onto which the laser beam LL emitted from the light source unit 4 is to be irradiated, at a time when each of the movable plates 511a inclines in a specific angle.

For this reason, the irradiation locus setting portion 73 can obtain the irradiation locus (path) of the laser beam LL on the light scanning plane 21 on the assumption that the laser beam LL is continuously emitted from the light source unit 4 and irradiated onto the light scanning plane 21, and records (sets) the obtained irradiation locus. In other words, the irradiation locus setting portion 73 records how the laser beam LL is irradiated and scanned on the light scanning plane 21.

Hereinafter, while the irradiation locus R shown in FIG. 7 is representatively described for the sake of description, it goes without saying that irradiation loci are not limited to the irradiation locus R. In addition, an initial point of the irradiation locus R is indicated with "initial point $R_1$" and an end point of the irradiation locus R is indicated with "end point $R_n$" (wherein n is a natural number).

Based on the irradiation locus R recorded by the irradiation locus setting portion 73, the unit irradiation area setting portion 74 sets the plurality of the unit irradiation areas $S_1$, $S_2$ ... $S_{n-1}$ on and along the irradiation locus R so as to have the identical length (in a scanning direction of the laser beam LL).

In this regard, it is to be noted that in this specification, the term "unit irradiation area" refers to a unit area on which the laser beam LL is irradiated. With the laser beam LL irradiated on each of the unit irradiation areas $S_1$ to $S_{n-1}$, each of them provides one of the pixels to thereby form a desired image on the light scanning plane 21. By setting the unit irradiation areas $S_1$ to $S_{n-1}$ in this manner, the unit irradiation areas $S_1$ to $S_{n-1}$ can be set substantially uniformly on the light scanning plane 21.

This makes it possible to suppress density of the pixels in each portion of the image to be formed on the light scanning plane 21 from becoming ununiformity to thereby form a natural image free from undesired distortion or deflection. In this regard, since each of the unit irradiation areas $S_1$ to $S_{n-1}$, onto which the laser beam LL is irradiated, provides one of the pixels of the image, the term "density of pixels" corresponds to the number of the unit irradiation areas present per unit length on the irradiation locus R.

While an example of a method of setting the unit irradiation areas $S_1$ to $S_{n-1}$ will be described herein, this is not intended to limit the method of setting the unit irradiation areas $S_1$ to $S_{n-1}$.

The unit irradiation area setting portion 74 of this embodiment obtains three-dimensional coordinates of the initial point $R_1$ based on the irradiation locus R set by the irradiation locus setting portion 73.

And then, the unit irradiation area setting portion 74 obtains three-dimensional coordinates of a point $R_2$ on the irradiation locus R which is displaced from the initial point $R_1$ at a predetermined length (hereinafter, referred to as "length L") in the scanning direction along the irradiation locus R.

Thereafter, the unit irradiation area setting portion 74 sets an area on the irradiation locus R between the initial point $R_1$ and the point $R_2$ as the unit irradiation area $S_1$.

In the same manner, the unit irradiation area setting portion 74 obtains three-dimensional coordinates of a point $R_3$ on the irradiation locus R which is displaced from the point $R_2$ at the length L in the scanning direction along the irradiation locus R, and sets an area on the irradiation locus R between the point $R_2$ and the point $R_3$ as the unit irradiation area $S_2$.

In this manner, the unit irradiation area setting portion 74 sets the unit irradiation areas $S_1$ to $S_{n-1}$ on the entire length of the irradiation locus R (from the initial point $R_1$ to the end point $R_n$). According to this method, the unit irradiation areas $S_1$ to $S_{n-1}$ can be set correctly and simply.

Such an unit irradiation area setting portion 74 as described above can very efficiently form a desired image (i.e., an image free from distortion or deflection) on the light scanning plane 21. This is because the unit irradiation area setting portion 74 can properly change the length L according to a requested quality (resolution) of the image to be formed on the light scanning plane 21 and simply set a corresponding number of the unit irradiation areas according to the quality thereof.

The number of the unit irradiation areas is preferably in the range of 100 thousand to ten million (e.g., horizontal resolution: 640×vertical resolution: 480), but may be different depending on a size and a shape of the light scanning plane 21 and a quality requested for an image to be formed.

While this embodiment has been described as setting pairs of the unit irradiation areas adjacent to each other (e.g., the unit irradiation areas $S_1$ and $S_2$) with substantially no interval, the pairs of the adjacent unit irradiation areas may be set as being spaced apart from each other at intervals. In this case, it is preferable that the intervals are the same.

The color determining portion 75 determines luminance of color of each of the pixels to be formed for each of the unit irradiation areas $S_1$ to $S_{n-1}$ based on image information (signal) inputted from an external unit (not shown).

For example, the color determining portion 75 may determine the luminance of each color by forming an imaginary image corresponding to image information on the light scanning plane 21, and then specifying the luminance of each color on a region corresponding to each of the unit irradiation areas $S_1$ to $S_{n-1}$.

In the meantime, the light intensity setting portion 76 sets the irradiation time (the emission time) and the intensity of the laser beam LL to be irradiated onto each of the unit irradiation areas $S_1$ to $S_{n-1}$. Hereinafter, an example of a method of setting the irradiation time and the intensity of the laser beam LL will be described.

The light intensity setting portion 76 reads the three-dimensional coordinates of the pair of the points $R_1$ and $R_2$, located on both ends of the unit irradiation area $S_1$, from the unit irradiation area setting portion 74. And then, based on a signal regarding the rotation of each of the movable plates 511a transmitted from the rotation detecting unit 52, the light intensity setting portion 76 obtains the irradiation time.

This irradiation time is a time in which the laser beam LL emitted from the light source unit 4 is irradiated onto the point $R_1$ located on an upstream end of the unit irradiation area $S_1$ in the scanning direction, and then is irradiated onto the point $R_2$ located on a downstream end thereof. Further, the light intensity setting portion 76 obtains the irradiation time for each of the unit irradiation areas $S_2$ to $S_{n-1}$ in the same manner.

Thereafter, the light intensity setting portion 76 defines the irradiation time and the intensity of the laser beam LL to be irradiated onto the unit irradiation areas $S_m$ (m is an integer of 1 to n-1) as $T_m$ and $P_m$, respectively, and sets (changes) the intensity $P_1, P_2, \ldots$ or $P_{n-1}$ of the laser beam LL for each of the unit irradiation areas $S_1$ to $S_{n-1}$ such that $T_m \times P_m$ with respect to each of them becomes the same value.

For example, in the case where a pixel with a 127th luminance level in 256 luminance levels is formed (displayed) on the unit irradiation area $S_1$, the intensity $P_1$ of the laser beam LL to be irradiated onto the unit irradiation areas $S_1$ is 0.5 times maximum intensity PM of the laser beam LL.

In addition, in the case where the irradiation time $T_1$ of the laser beam LL to be irradiated onto the unit irradiation area $S_1$ is two times the irradiation time $T_2$ of the laser beam LL to be irradiated onto the unit irradiation area $S_2$, the intensity $P_1$ of the laser beam LL to be irradiated onto the unit irradiation area $S_1$ is 0.5 times the intensity $P_2$ of the laser beam LL to be irradiated onto the unit irradiation area $S_2$.

That is, the light intensity setting portion 76 is configured to set the intensity $P_m$ of the laser beam LL to be irradiated onto the unit irradiation area $S_m$ corresponding to the irradiation time $T_m$ thereof. Specifically, the light intensity setting portion 76 is configured such that the longer the irradiation time of the laser beam LL to be irradiated onto the unit irradiation area is, the smaller the intensity thereof is set.

Since the intensity $P_m$ of the laser beam LL is determined for each of the unit irradiation areas $S_1$ to $S_{n-1}$ in such a manner, maximum amounts of light irradiated onto all the unit irradiation areas $S_1$ to $S_{n-1}$ can be set substantially the same value. As a result, it is possible to prevent an image to be formed from having uneven brightness. This makes it possible to obtain a more natural image on the light scanning plane 21.

The generating portion 77 is connected to the color determining portion 75 and the light intensity setting portion 76. The generating portion 77 receives a signal regarding the luminance of the color of each of the pixels to be formed on the unit irradiation areas $S_1$ to $S_{n-1}$ and a signal regarding the irradiation time and the intensity of the laser beam LL to be irradiated onto each of the unit irradiation areas $S_1$ to $S_{n-1}$.

Further, based on the received signals, the generating portion 77 performs matching between the luminance of the color, and the irradiation time and the intensity of the laser beam LL for each of the unit irradiation areas $S_1$ to $S_{n-1}$, to thereby generate the unit drive pattern of the each of them and obtain the drive pattern constituted from the unit drive patterns. A signal regarding the drive pattern is transmitted to the operation control unit 8.

Here, the larger the incidence angle (an average incidence angle) of the laser beam LL to be irradiated onto the unit irradiation area has, the smaller the rotation angle of the movable plate 511a of the actuator 51, which is provided on a side of the light scanning plane 21, can be set. Therefore, a time required for irradiating the laser beam LL onto the unit irradiation area from a point upstream to a point downstream in the scanning direction becomes shorter.

Thus, the generating portion 77 generates the unit drive patterns in such a manner that the larger the incidence angle of the laser beam LL to be irradiated onto the unit irradiation area has, the shorter the irradiation time thereof (that is, the emission time of the laser beam LL emitted from the light source unit 4) is set. This makes it possible to more effectively form a natural image free from deflection or distortion on the light scanning plane 21.

Further, the longer the distance from the unit irradiation area to the light source unit 4, that is, the optical path of the laser beam LL has, the larger the incidence angle (the average incidence angle) of the laser beam LL to be irradiated onto the corresponding unit irradiation area becomes. Therefore, as described above, the time required for irradiating the laser beam LL onto the unit irradiation area from the point upstream to the point downstream in the scanning direction becomes shorter.

Thus, the generating portion 77 generates the unit drive patterns in such a manner that the longer the distance from the unit irradiation area to the light source unit 4 has, the shorter the irradiation time thereof (that is, the emission time of the laser beam LL emitted from the light source unit 4) is set. This makes it possible to more effectively form a natural image free from deflection or distortion on the light scanning plane 21.

Although such a drive pattern generating unit 7 as described above has a relatively simple construction, it can generate a drive pattern of the light source unit 4 constituted from unit drive patterns each having high accuracy.

The operation control unit 8 is connected to the memory 72 and receives a signal from the memory 72, the signal regarding the optical path of the laser beam LL between the pair of the actuators 51 and the three-dimensional coordinates of the pair of the actuators 51.

Based on the received signal, relative positional relationships between the pair of the actuators 51 and the respective points $R_1$ to $R_n$ can be obtained. This makes it possible to determine which point among the points $R_1$ to $R_n$, onto which the laser beam LL emitted from the light source unit 4 is to be irradiated, at a time when each of the movable plates 511a inclines in a specific angle.

The operation control unit 8 also receives a signal regarding the rotation of the pair of the movable plates 511a from the rotation detecting portion 52. Thus, the light source unit 4 is operated by the operation control unit 8 according to the unit drive patterns generated in the generating portion 77, to irradiate the laser beam LL onto the respective unit irradiation areas $S_1$ to $S_{n-1}$ of the light scanning plane 21.

For example, at the almost same time when each of the movable plates 511a inclines such that the laser beam LL is irradiated onto the point $R_1$, the light source unit 4 begins to irradiate the laser beam LL with the irradiation time and the intensity thereof corresponding to the unit irradiation area $S_1$.

As soon as the irradiation of the laser beam LL onto the unit irradiation area $S_1$ is completed, the light source unit 4 begins to irradiate the laser beam LL with the irradiation time and the intensity thereof corresponding to the unit irradiation area $S_2$. With respect to the unit irradiation areas $S_3$ to $S_{n-1}$, the light source unit 4 is operated by the operation control unit 8 in the same manner as described above.

In such a manner, it is possible to form a natural image free from distortion or deflection on the light scanning plane 21, and thus the observer can observe the natural image even in the case where the light scanning plane 21 is viewed at any position.

According to the image forming apparatus 1 as described above, the plurality of the unit irradiation areas, onto which the laser beam LL is irradiated, is set depending on the shape of the light scanning plane 21, and the laser beam LL having a desired color is irradiated onto the respective unit irradiation areas.

This makes it possible to suppress the density of the pixels in each portion of the image to be formed on the light scanning plane 21 from becoming ununiformity. As a result, it is possible to form a natural image on the light scanning plane 21.

In this regard, the ununiformity in the density of the pixels would be generated due to the differences between the incident angles of the laser beam LL to be irradiated with respect to the portions of the light scanning plane 21 corresponding to the respective pixels or the differences between distances from the light source unit 4 to the respective portions of the light scanning plane 21.

Second Embodiment

Next, a second embodiment of the image forming apparatus of the present invention will be described.

Figure 8:
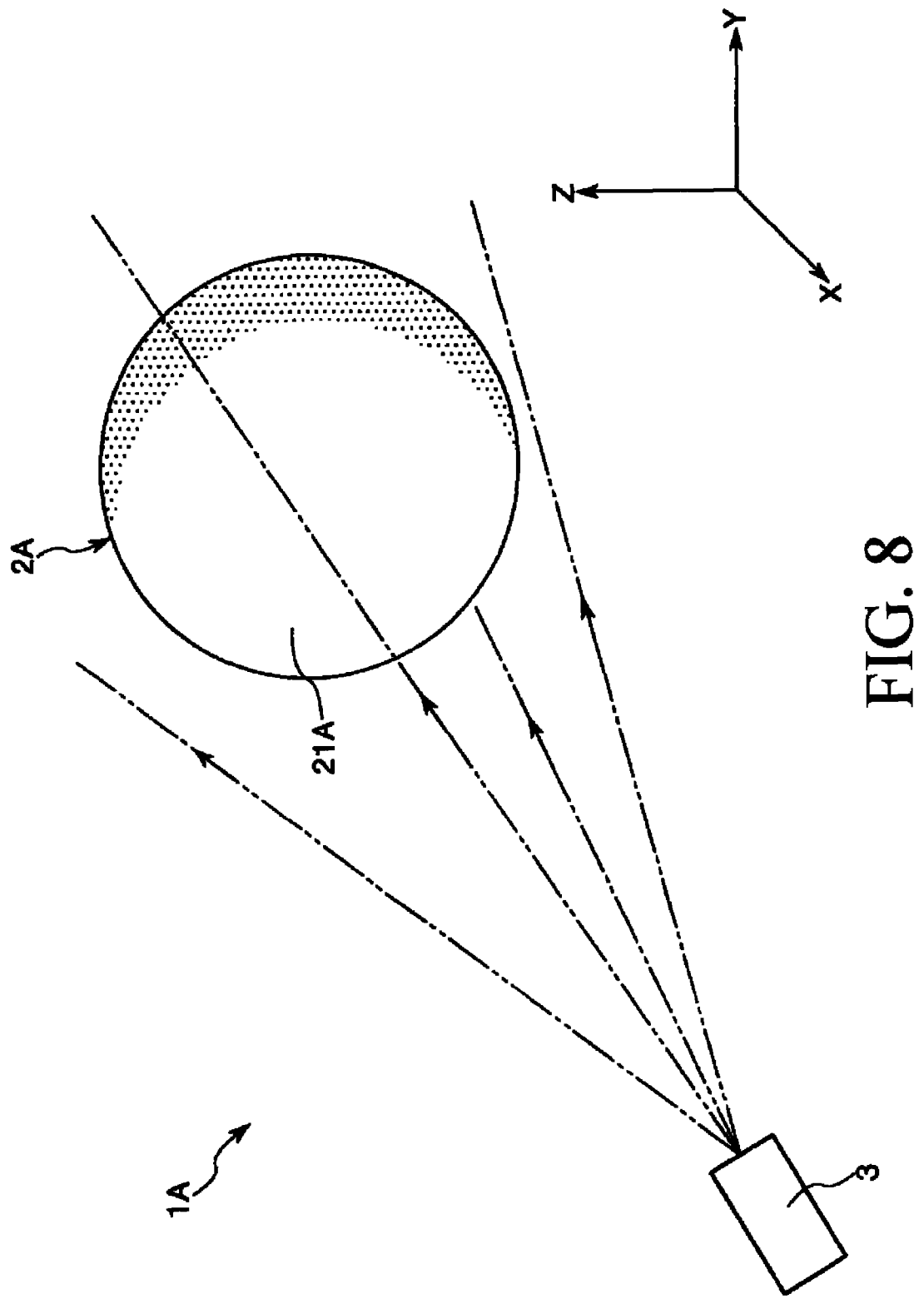
FIG. 8 is a view illustrating a screen of an image forming apparatus according to a second embodiment of the present invention.

FIG. 8 is a view illustrating a screen of the image forming apparatus according to the second embodiment of the present invention.

Hereinafter, the image forming apparatus of the second embodiment will be described with respect to differences from the image forming apparatus of the above-described embodiment, in which descriptions of the same matters will be omitted.

The image forming apparatus according to the second embodiment of the present invention is substantially the same as the image forming apparatus of the first embodiment, except for the shape of the screen. In addition, the same reference numerals are used to designate the same components as those of the first embodiment.

As shown in FIG. 8, the screen 2A has a substantially spherical shape and a surface thereof defines a light scanning plane 21A. In the case where x, y and z are coordinates on the light scanning plane 21A corresponding to three X, Y and Z axes which are orthogonal to each other, the shape of the light scanning plane 21A can be represented by a function: f(x, y, z).

For example, when a center of the screen 2A is represented by coordinates $(x_0, y_0, z_0)$ and a radius thereof is r, the light scanning plane 21A can be represented by an equation:

$$(x-x_0)^2+(y-y_0)^2+(z-z_0)^2=r^2.$$

Thus, the shape specifying portion 71 of the drive pattern generating unit 7 has the above-described function recorded therein and is configured to specify the shape of the light scanning plane 21A based on this function. This makes it possible to more correctly specify the shape of the light scanning plane 21A.

In the meantime, in the case where the shape of the light scanning plane 21A can be approximated by the function: f(x, y, z), the shape of the light scanning plane 21A can be also specified based on the function: f(x, y, z).

The second embodiment as described above can have the same effects as the first embodiment.

Third Embodiment

Next, a third embodiment of the image forming apparatus of the present invention will be described.

Figure 9:
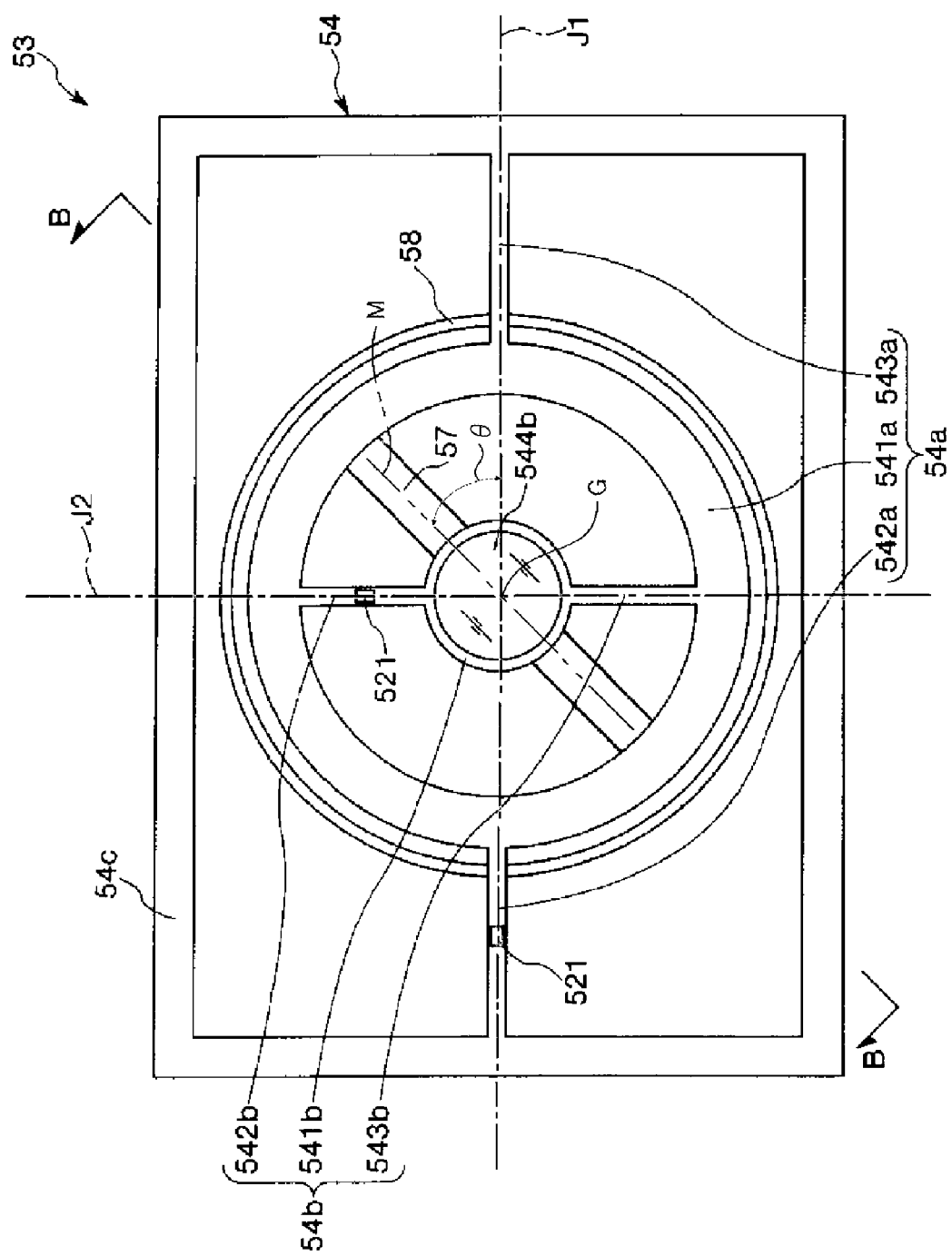
FIG. 9 is a schematic plan view illustrating an actuator of an image forming apparatus according to a third embodiment of the present invention.
Figure 10:
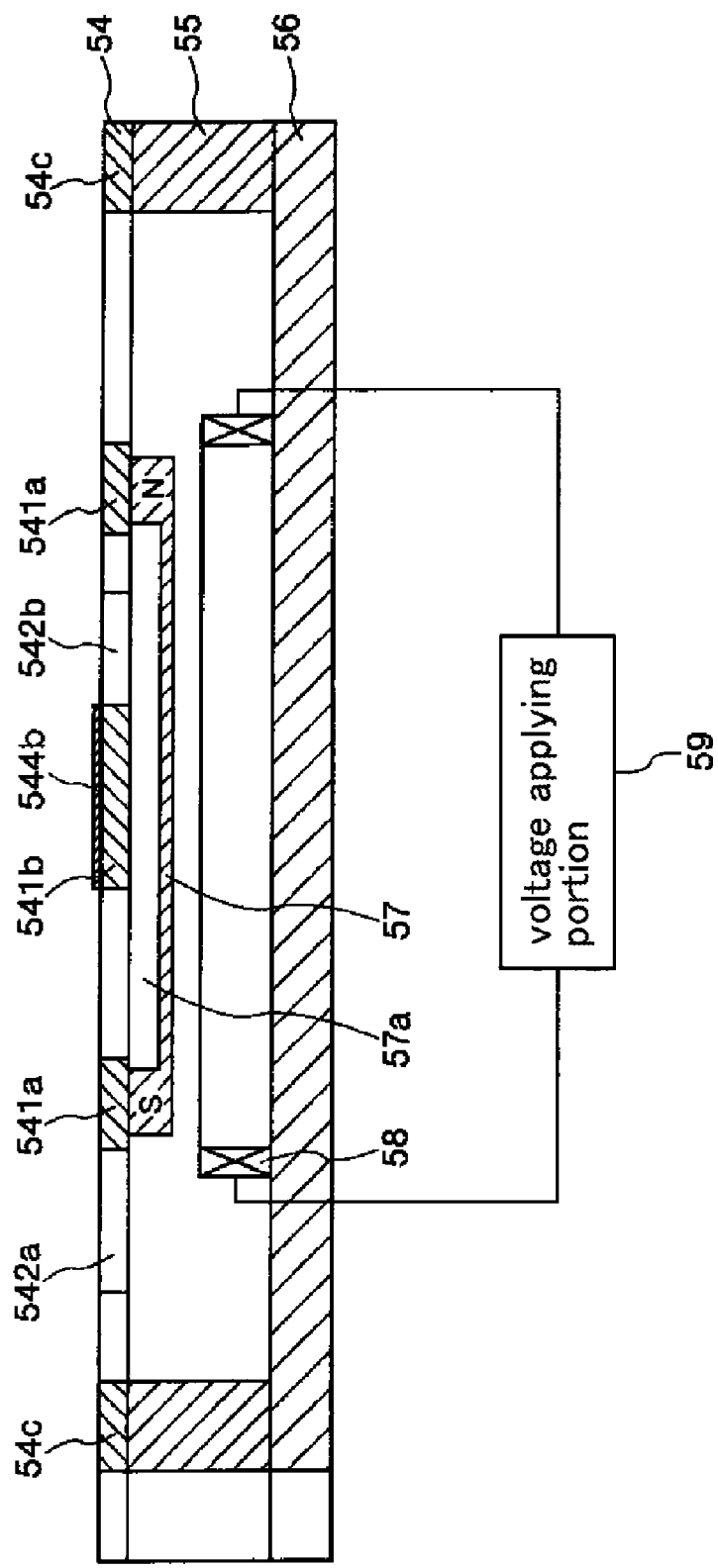
FIG. 10 is a cross-sectional view taken along a line B-B shown in FIG. 9.

FIG. 9 is a schematic plan view illustrating an actuator of the image forming apparatus according to the third embodiment of the present invention, and FIG. 10 is a cross-sectional view taken along a line B-B shown in FIG. 9.

Figure 11:
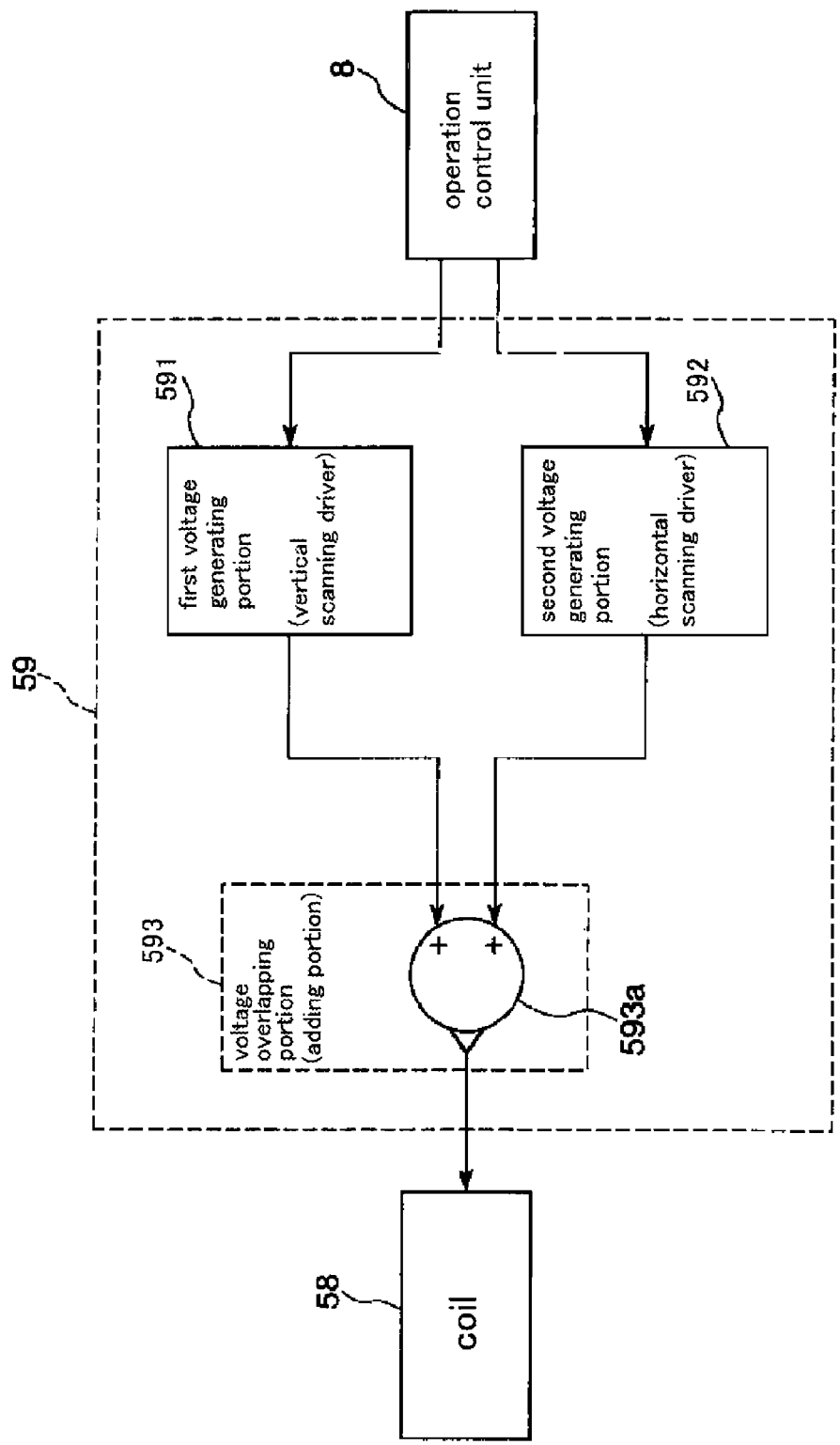
FIG. 11 is a block diagram illustrating a driving portion of an actuator shown in FIG. 10.
Figure 12A:
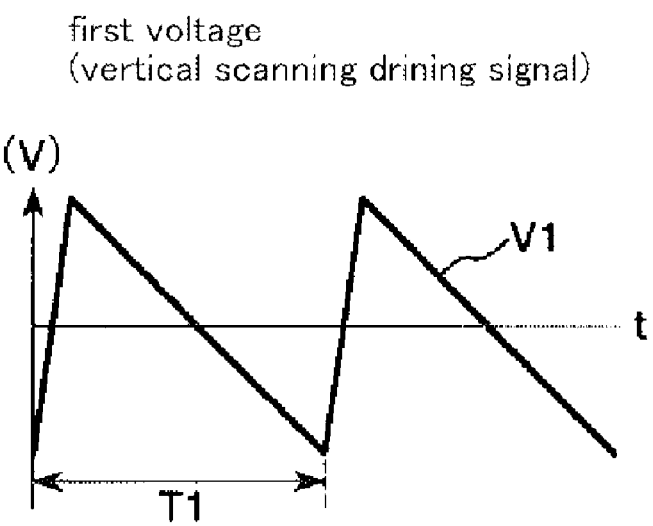
FIGS. 12A and 12B are views illustrating an example of voltages generated from first and second voltage generating portions shown in FIG. 11, respectively.
Figure 12B:
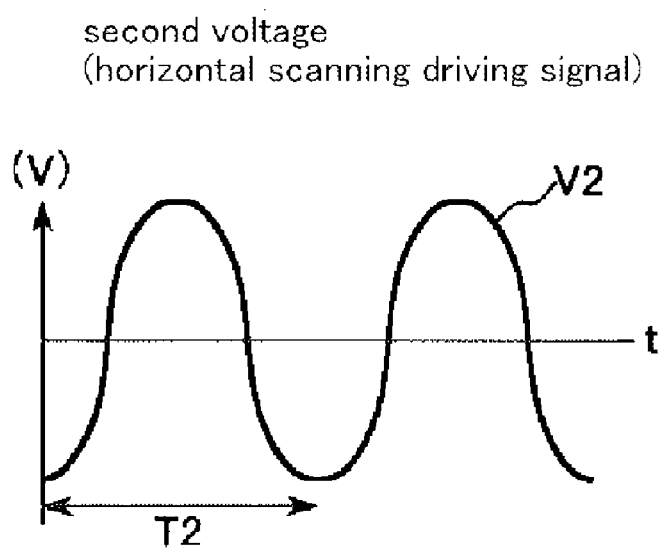

FIG. 11 is a block diagram illustrating a driving portion of an actuator shown in FIG. 10, and FIGS. 12A and 12B are views illustrating an example of voltages generated from first and second voltage generating portions shown in FIG. 11, respectively.

For the sake of convenience, in the following description, a front of the drawing plane, a rear of the drawing plane, a right side and a left side shown in FIG. 9 will be referred to as "upper (top)", "lower (bottom)", "right" and "left", respectively, and an upper side, a lower side, a right side and a left side shown in FIG. 10 will be referred to as "upper (top)", "lower (bottom)", "right" and "left", respectively, if not otherwise specified.

Hereinafter, the image forming apparatus of the third embodiment will be described with respect to differences from the image forming apparatus of the above-described embodiments, in which descriptions of the same matters will be omitted.

The image forming apparatus according to the third embodiment of the present invention is substantially the same as the image forming apparatus of the first embodiment, except for the construction of the actuator provided in the light scanning unit of the image forming apparatus. In addition, the same reference numerals are used to designate the same components as those of the first embodiment.

The light scanning unit 5 has one actuator 53.

As shown in FIG. 9, the actuator 53 includes a substrate 54 having a first vibration system 54a, a second vibration system 54b and a supporting portion 54c, an opposite substrate 56 provided so as to face the substrate 54, a spacer member 55 provided between the substrate 54 and the opposite substrate 56, a permanent magnet 57 and a coil 58.

The first vibration system 54a includes a frame-shaped driving portion 541a provided inside a frame-shaped supporting portion 54c and a pair of first connecting portions 542a and 543a supporting both sides of the driving portion 541a on the supporting portion 54c.

The second vibration system 54b includes a movable plate 541b provided inside the driving portion 541a and a pair of second connecting portions 542b and 543b supporting both sides of the movable plate 541b on the driving portion 541a.

The driving portion 541a has a toric shape in a planar view thereof as shown in FIG. 9. The shape of the driving portion 541a is not specifically limited thereto as long as the driving portion 541a has a frame shape. For example, the driving portion 541a may have a quadrangular ring shape in the planar view thereof as shown in FIG. 9.

The permanent magnet 57 is bonded to a bottom of such a driving portion 541a.

Each of the first connecting portions 542a and 543a has a longitudinal shape. In addition, the first connecting portions 542a and 543a are elastically deformable. The first connecting portions 542a and 543a connect the driving portion 541a to the supporting portion 54c such that the driving portion 541a can rotate with respect to the supporting portion 54c.

The first connecting portions 542a and 543a are coaxially provided with each other and the driving portion 541a is configured to rotate with respect to the supporting portion 54c around one rotation axis. In other words, the driving portion 541a has one rotation axis and the first connecting portions 542a and 543a define the one rotation axis (hereinafter, referred to as "rotation axis J1").

A piezoelectric element 521 that detects rotation of the movable plate 541b (a rotation angle around the rotation axis J1) is provided on the first connecting portion 542a.

The movable plate 541b has a circular shape in a planar view thereof as shown in FIG. 9. The shape of the movable plate 541b is not specifically limited thereto as long as the movable plate 541b can be formed inside the driving portion 541a. For example, the movable plate 541b may have an ellipse or quadrangle shape in the planar view thereof.

A light reflector 544b having light reflectivity is formed on an upper surface of such a movable plate 541b.

Each of the second connecting portions 542b and 543b has a longitudinal shape. In addition, the second connecting portions 542b and 543b are elastically deformable. The second connecting portions 542b and 543b connect the movable plate 541b to the driving portion 541a such that the movable plate 541b can rotate with respect to the driving portion 541a.

The second connecting portions 542b and 543b are coaxially provided with each other and the movable plate 541b is configured to rotate with respect to the driving portion 541a around one rotation axis. In other words, the movable plate 541b has one rotation axis and the second connecting portions 542b and 543b define the one rotation axis (hereinafter, referred to as "rotation axis J2").

A piezoelectric element 521 that detects rotation of the movable plate 541b (a rotation angle around the rotation axis J2) is provided on the second connecting portion 542b.

As shown in FIG. 9, the rotation axis J1 and the rotation axis J2 are orthogonal to each other. Centers of the driving portion 541a and the movable plate 541b are located on an intersection point between the rotation axis J1 and the rotation axis J2 in a planar view of the actuator 53.

In this regard, it is to be noted that for the sake of convenience, the intersection point between the rotation axis J1 and the rotation axis J2 will be referred to as "intersection point G" on occasion.

As shown in FIG. 10, the substrate 54 as described above is bonded to the opposite substrate 55 via the spacer member 55.

The coil 58 that generates a magnetic field acting to the permanent magnet 57 is provided on an upper surface of the opposite substrate 56.

As shown in FIG. 9, the permanent magnet 57 is provided along a segment that passes through the intersection point G and inclines with respect to each of the rotation axis J1 and the rotation axis J2 in the planar view of the actuator 53 (hereinafter, the segment will be referred to as "segment M").

One side of the permanent magnet 57 from the intersection point G in a longitudinal direction thereof is S pole and the other side thereof is N pole. Referring to FIG. 10, a left side of the permanent magnet 57 in the longitudinal direction thereof is the S pole and a right side thereof is the N pole.

As shown in FIG. 9, an angle of inclination θ of the segment M with respect to the rotation axis J1 is preferably in the range of 30 to 60°, more preferably in the range of 40 to 50°, and even more preferably about 45°. By providing the permanent magnet 57 in such a manner, it is possible for the movable plate 541b to smoothly rotate around each of the rotation axes J1 and J2. In this embodiment, the segment M inclines at an angle of about 45° with respect to each of the rotation axes J1 and J2.

In addition, as shown in FIG. 10, a recess 57a is formed on an upper surface of the permanent magnet 57. The recess 57a is a relief that prevents the permanent magnet 57 from coming into contact with the movable plate 541b. Formation of such a recess 57a makes it possible to prevent the movable plate 541b from coming into contact with the permanent magnet 57 when the movable plate 541b rotates around the rotation axis J2.

As shown in FIG. 9, the coil 58 is configured to surround an outer circumference of the driving portion 541a in a planar view thereof. This makes it possible to reliably prevent the driving portion 541a from coming into contact with the coil 58 in operation of the actuator 53. As a result, an interval between the coil 58 and the permanent magnet 57 can be relatively reduced so that the magnetic field generated from the coil 58 can efficiently act to the permanent magnet 57.

The coil 58 is electrically connected to a voltage applying portion 59. When a voltage is applied to the coil 58 via the voltage applying portion 59, the coil 58 generates a magnetic field along a direction orthogonal to both the rotation axes J1 and J2.

As shown in FIG. 11, the voltage applying portion 59 includes a first voltage generating portion 591 that generates a first voltage V1 for rotating the movable plate 541b around the rotation axis J1, a second voltage generating portion 592 that generates a second voltage V2 for rotating the movable plate 541b around the rotation axis J2, and a voltage overlapping portion 593 that overlaps the first and second voltages V1 and V2 and applies the overlapped voltage to the coil 58.

As shown in FIG. 12A, the first voltage generating portion 591 is configured to generate the first voltage V1 (a voltage for vertical scanning) that periodically changes at a period T1. The first voltage V1 has a waveform of a saw-tooth wave. Therefore, a state of the movable plate 541b can be rapidly returned to an initial state. As a result, the actuator 53 can effectively perform the vertical scanning (sub scanning) of the laser beam LL.

However, this is not intended to limit the waveform of the first voltage V1. A frequency (1/T1) of the first voltage V1 is not particularly limited to a specific value as long as it is suitable for the vertical scanning, but is preferably in the range of 30 to 80 Hz, and especially preferably about 60 Hz.

In this embodiment, the frequency of the first voltage V1 is tuned to be different from a torsional resonance frequency of the first vibration system 54a, which includes the driving portion 541a and the pair of the first connecting portions 542a and 543a.

In the meantime, as shown in FIG. 12B, the second voltage generating portion 592 is configured to generate the second voltage V2 (a voltage for horizontal scanning) that periodically changes at a period T2 different from the period T1.

The second voltage V2 has a waveform of a sine wave. Therefore, it is possible to stably and smoothly rotate the movable plate 541b. As a result, the actuator 53 can effectively perform the horizontal scanning (main scanning) of the laser beam LL. However, this is not intended to limit the waveform of the second voltage V2.

It is preferred that a frequency of the second voltage V2 is higher than that of the first voltage V1. This makes it possible to more reliably and efficiently rotate the movable plate 541b around the rotation axis J1 at the frequency of the first voltage V1 and around the rotation axis J2 at the frequency of the second voltage V2.

In addition, the frequency of the second voltage V2 is not particularly limited to a specific value as long as it is different from that of the first voltage V1 and is suitable for the horizontal scanning, but is preferably in the range of 10 to 40 kHz.

By setting the frequency of the second voltage V2 to the above range of 10 to 40 kHz and setting the frequency of the first voltage V1 to about 60 Hz, it is possible to rotate the movable plate 541b around both the rotation axes J1 and J2 at a suitable frequency for forming an image on the screen.

In this regard, it is to be noted that combinations of the frequency of the first voltage V1 and the frequency of the second voltage V2 are not particularly limited to specific combinations as long as the movable plate 541b can rotate around both the rotation axes J1 and J2.

In this embodiment, the frequency of the second voltage V2 is tuned to be identical with a torsional resonance frequency of the second vibration system 54b, which includes the movable plate 541b and the pair of the second connecting portions 542b and 543b. This makes it possible to increase the rotation angle of the movable plate 541b around the rotation axis J2.

In addition, in the case where the torsional resonance frequency of the first vibration system 54a is defined as $f_1$ (Hz) and the torsional resonance frequency of the second vibration system 54b is defined as $f_2$ (Hz), $f_1$ and $f_2$ preferably satisfy a relationship of $f_2 > f_1$, and more preferably satisfy a relationship of $f_2 \geqq 10 f_1$.

This makes it possible to more efficiently rotate the movable plate 541b around the rotation axis J1 at the frequency of the first voltage V1 and around the rotation axis J2 at the frequency of the second voltage V2.

Both the first voltage generating portion 591 and the second voltage generating portion 592 are connected to the operation control unit 8, and are operated based on signals from the operation control unit 8. Here, the voltage overlapping portion 593 is connected to both the first voltage generating portion 591 and the second voltage generating portion 592.

The voltage overlapping portion 593 includes an adder 593a that applies a voltage to the coil 58. The adder 593a receives the first voltage V1 from the first voltage generating portion 591, receives the second voltage V2 from the second voltage generating portion 592, overlaps the first and second voltages V1 and V2, and then applies the overlapped voltage to the coil 58.

The actuator 53 configured as above operates as follows.

For example, the first voltage V1 as shown in FIG. 12A and the second voltage V2 as shown in FIG. 12B are overlapped at the voltage overlapping portion 593, and the overlapped voltage is applied to the coil 58 (the overlapped voltage is also referred to as "voltage V3" on occasion).

At this time, a portion of the voltage V3 corresponding to the first voltage V1 causes alternating magnetic fields, in which a magnetic field acts to attract the S pole of the permanent magnet 57 towards the coil 58 but separate the N pole thereof away from the coil 58, and a magnetic field acts to separate the S pole thereof away from the coil 58 but attract the N pole thereof towards the coil 58.

As a result, the driving portion 541a together with the movable plate 541b rotates around the rotation axis J1 at the frequency of the first voltage V1 while torsionally deforming the first connecting portions 542a and 543a.

In the meantime, the frequency of the first voltage V1 is set to be very lower than that of the second voltage V2, and the torsional resonance frequency of the first vibration system 54a is designed to be lower than that of the second vibration system 54b. Thus, the first vibration system 54a can more easily vibrate than the second vibration system 54b and thereby prevent the movable plate 541b from rotating around the rotation axis J2 at the first voltage V1.

On the other hand, a portion of the voltage V3 corresponding to the second voltage V2 causes alternating magnetic fields, in which a magnetic field acts to attract the S pole of the permanent magnet 57 towards the coil 58 but separate the N pole thereof away from the coil 58, and a magnetic field acts to separate the S pole thereof away from the coil 58 but attract the N pole thereof towards the coil 58.

As a result, the movable plate 541b rotates around the rotation axis J2 at the frequency of the second voltage V2 while torsionally deforming the second connecting portions 542b and 543b.

In this regard, since the frequency of the second voltage V2 is identical with the torsional resonance frequency of the second vibration system 54b, the movable plate 541b can rotate dominantly around the rotation axis J2 at the second voltage V2. Therefore, it is possible to prevent the movable plate 541b from rotating around the rotation axis J1 at the second voltage V2.

According to the actuator 53 as described above, it is possible to two-dimensionally scan the laser beam LL using one actuator so that a space of the light scanning unit 5 can be reduced. For example, in the case where the pair of the actuators are used as in the first embodiment, it is required that a relative positional relationship between the actuators is set with high accuracy, but in this embodiment, such a requirement can be omitted. This makes it possible to easily manufacture an image forming apparatus.

The third embodiment as described above can have the same effects as the first embodiment.

Although the image forming apparatus according to the present invention have been described above based on the embodiments illustrated in the drawings, the present invention is not limited thereto.

For example, individual components constituting the image forming apparatus may be replaced by other arbitrary components that can exhibit similar functions. Further, arbitrary components may be added to the image forming apparatus if necessary.

Furthermore, although the foregoing embodiments have been described as the image forming apparatus main body is configured to form an image on the screen, this is not intended to limit. Rather, the image forming apparatus main body may be configured to form an image on other objects such as a rock and a wall. In addition, the shape of the light scanning plane is not particularly limited to a specific type, but may be planar.

What is claimed is:

1. An image forming apparatus that forms an image composed of pixels on an image forming plane, which is set on a surface of a target, by irradiating and scanning light onto the image forming plane, the image forming apparatus comprising:
- a light emitting unit that emits the light;
- a light scanning unit having at least one actuator in which a movable plate having a light reflector that reflects the light emitted from the light emitting unit is rotatably provided around one rotation axis or two rotation axes which are orthogonal to each other, the actuator irradiating and scanning the light reflected on the light reflector onto the image forming plane by rotation of the movable plate;
- a drive pattern generating unit that generates a drive pattern of the light emitting unit, wherein the light emitting unit can emit the light with emission timing and emission time to suppress density of the pixels in each portion of the image to be formed on the image forming plane from becoming ununiformity, and wherein the ununiformity in the density of the pixels would be generated due to differences between distances from the light emitting unit to the respective portions of the image forming plane; and
- a controlling unit that controls operation of the light emitting unit based on the drive pattern generated by the drive pattern generating unit,
- wherein the drive pattern generating unit sets a plurality of unit irradiation areas, onto which the light is irradiated, on the image forming plane, each of the unit irradiation areas having substantially the identical length in a scanning direction of the light to provide one of the pixels of the image, and wherein the drive pattern generating unit generates a plurality of unit drive patterns corresponding to the respective unit irradiation areas, and the unit drive patterns constitute the drive pattern, and the drive pattern generating unit includes:
    - a shape specifying portion that specifies a shape of the image forming plane;
    - an irradiation locus setting portion that sets an irradiation locus of the light based on the shape specified by the shape specifying portion;
    - an unit irradiation area setting portion that sets the plurality of the unit irradiation areas on and along the set irradiation locus;
    - a light intensity setting portion that sets the emission time and an intensity of the light emitted from the light emitting unit for each of the unit irradiation areas, and the intensity of the light is changed according to the emission time thereof for each of the unit irradiation areas; and
    - a generating portion that generates the drive pattern of the light emitting unit based on the emission time and the intensity of the light set by the light intensity setting portion, and
- wherein the drive pattern generating unit generates the unit drive patterns in such a manner that the longer the distance from the light emitting unit to the unit irradiation area has, the shorter the emission time of the light emitted from the light emitting unit is set.

2. The image forming apparatus as claimed in claim 1, wherein in the case where X, Y and Z axes are set as three orthogonal coordinate axes and coordinates on the image forming plane corresponding to the X, Y and Z axes are defined as x, y and z, the image forming plane has a geometrical shape that can be represented by or approximated to a function: $f(x, y, z)$ and the shape specifying portion specifies the geometrical shape of the image forming plane based on the function.

3. The image forming apparatus as claimed in claim 1, wherein in the case where the image forming plane has a shape with irregularly curved and/or bended regions, the shape specifying portion defines the image forming plane as a set of polygons and specifies the shape of the image forming plane based on three-dimensional coordinates of the apexes of the respective polygons.

4. The image forming apparatus as claimed in claim 1, wherein the ununiformity in the density of the pixels would be generated due to differences between incident angles of the light to be irradiated with respect to portions of the image forming plane corresponding to the respective pixels, and wherein the drive pattern generating unit generates the unit drive patterns in such a manner that the larger the incident angle of the light to be irradiated on the unit irradiation area has, the shorter the emission time of the light emitted from the light emitting unit is set.

5. The image forming apparatus as claimed in claim 1, wherein the at least one actuator comprises a pair of the actuators,
- wherein each of the actuators includes the movable plate having a rotation axis, a supporting portion that rotatably supports the movable plate, at least one connecting portion that connects the movable plate to the supporting portion and defines the rotation axis, and a driving portion that rotates the movable plate, and
- wherein the actuators are provided such that the rotation axis of the movable plate of one of the actuators and the rotation axis of the movable plate of the other actuator are orthogonal to each other.

6. The image forming apparatus as claimed in claim 1, wherein the light scanning unit further includes a rotation detecting portion that detects the rotation of the movable plate of the at least one actuator, and
- wherein the controlling unit controls the operation of the light emitting unit based on a result of the detection by the rotation detecting portion and the drive pattern.

7. The image forming apparatus as claimed in claim 1, wherein the target comprises a screen.

8. The image forming apparatus as claimed in claim 1, wherein the drive pattern generating unit further includes a color determining portion that determines luminance of color of each of the pixels to be formed for each of the unit irradiation areas.

* * * * *